(12) United States Patent
Ohkawa (10) Patent No.: US 7,284,884 B2
(45) Date of Patent: Oct. 23, 2007

(54) SURFACE LIGHT SOURCE DEVICE, IMAGE DISPLAY AND LIGHT CONTROL PLATE

(75) Inventor: Shingo Ohkawa, Misato (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/900,319

(22) Filed: Jul. 28, 2004

(65) Prior Publication Data
US 2005/0088847 A1    Apr. 28, 2005

(30) Foreign Application Priority Data
Aug. 1, 2003    (JP) ............................. 2003-284732

(51) Int. Cl.
*F21V 5/00*    (2006.01)
(52) U.S. Cl. ...................... 362/327; 362/244; 362/329; 362/330; 362/606
(58) Field of Classification Search ................ 362/327, 362/244, 606, 329, 330
See application file for complete search history.

(56) References Cited

U.S. PATENT DOCUMENTS

| | | | | |
|---|---|---|---|---|
| 4,120,018 | A * | 10/1978 | Nagel ......................... | 362/333 |
| 6,450,661 | B1 * | 9/2002 | Okumura .................... | 362/240 |
| 2003/0223249 | A1 * | 12/2003 | Lee et al. ................... | 362/561 |
| 2005/0030730 | A1 * | 2/2005 | Ohkawa et al. ............... | 362/31 |

FOREIGN PATENT DOCUMENTS

JP    06-104489    4/1994

* cited by examiner

*Primary Examiner*—Sandra O'Shea
*Assistant Examiner*—Meghan K. Dunwiddie
(74) *Attorney, Agent, or Firm*—Staas & Halsey LLP (57) ABSTRACT

Primary light is directed to a light path control plate from at least one point-like light source. The light path control plate has an inner face on which projection-like transmission-reflection portions and curved-for-refraction portions are alternately formed along a leaving-direction from an optical axis direction of the point-like light source, wherein each transmission-reflection portion is composed of a transmission face permitting primary light to transmit through the transmission face and a reflection face which reflects the transmitted light as to bring changed light paths directed to an outer face of the light path control plate while each curved-for-refraction portion refracts primary light as to bring changed light paths directed to the outer face of the light path control plate. First light reaching the outer face via the transmission-reflection portions and second light reaching the outer face via the curved-for-refraction portions are generated from primary light. The first light and second light are emitted from the outer face. A plurality of sections each of which is equivalent to the above light path control plate may be formed on substrate for providing illumination for a large screen display.

13 Claims, 12 Drawing Sheets

SURFACE LIGHT SOURCE DEVICE, IMAGE DISPLAY AND LIGHT CONTROL PLATE

BACKGROUND

1. Field of Invention

The present invention relates to a surface light source device, image display and light path control plate which employ point-like light sources as light emitting source.

2. Related Art

So-called "collective-type-LED display" is known as a display utilizing a surface light source device employing a plurality of point-like light sources, being disclosed, for example, in Tokkai-Hei 6-104489 (Japan). According to the disclosure, a casing accommodates a substrate on which a plurality of light emitting diodes (LEDs) are mounted as point-like light sources like a matrix. Lenses are disposed immediately in front of light emitting faces of the LEDs. The lenses have lower faces providing flat faces and upper faces providing convergent lens structures convergence of which is higher in a upper-lower diction as compared with in a lateral direction.

This display is subject to problems such that light for displaying involves glaring or blurring occurs between pixels because light emitted from LED is converged. In such conventional displays, directivity of light emitted from LED is only modified as to be converged, with the result that viewing angle is narrow and image clearness falls when viewing direction is deviated from a frontal direction of the display screen. This problem is serious, in particular, for large screen size displays.

OBJECT AND SUMMARY OF INVENTION

An object of the present invention is to provide a surface light source device, image display and light control plate which are able to overcome the above problems. According to the present invention, light emitted from a plurality of point-like light sources is dispersed well like a surface light source and emission direction control is achieved, and display quality viewed from oblique directions is improved.

In the first place, the present invention is applied to a surface light source device comprising a light path control plate and at least one point-like light source supply primary light toward said light path control plate.

According to a feature of the present invention, said light path control plate has an inner face to which said primary light is incident and an outer face which is opposite with said inner face, said inner face being provided with projection-like transmission-reflection portions, each of which is composed of a transmission face permitting primary light to transmit through the transmission face and a reflection face which reflects transmitted light as to bring changed light paths directed to said outer face, and curved-for-refraction portions, each of which refracts primary light as to bring changed light paths directed to said outer face, said transmission-reflection portions and curved-for-refraction portions being arranged alternatingly.

Thereby first light reaching the outer face via said transmission-reflection portions and second light reaching said outer face via said curved-for-refraction portions are generated from primary light so that said first light and second light are emitted from said outer face as a synthesized light.

It is not ed that said transmission-reflection portions and curved-for-refraction portions may extend in parallel to each other.

In the next place, the present invention is applied to a display comprising a light path control plate, a plurality of point-like light sources supply primary light toward said light path control plate and a display part.

According to another feature of the present invention, said light path control plate has a plurality of sections each of which has an inner face and an outer face, and at least one point-like light source is disposed opposite to an inner face of each of said sections for supplying primary light the same inner face.

Said inner face is provided with projection-like transmission-reflection portions, each of which is composed of a transmission face permitting primary light to transmit through the transmission face and a reflection face which reflects transmitted light as to bring changed light paths directed to said outer face, and curved-for-refraction portions, each of which refracts primary light as to bring changed light paths directed to said outer face, said transmission-reflection portions and curved-for-refraction portions being arranged alternatingly.

Thereby first light reaching the outer face via said transmission-reflection portions and second light reaching said outer face via said curved-for-refraction portions re generated from primary light so that said first light and second light provide, at said outer face, a synthesized light that illuminates said display part for displaying operation.

It is noted that said transmission-reflection portions and said curved-for-refraction portions of all of said sections may extend in one extending direction, and projection-like directivity-giving portions may be formed along a direction vertical to said one extending direction on said outer face for changing paths of light emitted from said point-like light source is changed, after being changed by said transmission-reflection portions and said curved-for-refraction portions, so that said paths are inclined to any one side with respect to said one extending direction.

In addition, said plurality of point-like light sources may include a plurality of point-like light sources emitting light of different colors from each other. Said display part may be disposed on said light path control plate, or separately from said light path control plate.

Further, the present invention is applied to a light path control plate comprising an inner face to which primary light from at least one point-like light source is incident and an outer face opposite with said inner face.

According to still another feature of the present invention, said inner face is provided with projection-like transmission-reflection portions, each of which is composed of a transmission face permitting primary light to transmit through the transmission face and a reflection face which reflects transmitted light as to bring changed light paths directed to said outer face, and curved-for-refraction portions, each of which refracts primary light as to bring changed light paths directed to said outer face, said transmission-reflection portions and curved-for-refraction portions are arranged alternatingly. along a leaving-direction from an optical axis direction of said point-like light source.

Thereby first light reaching the outer face via said transmission-reflection portions and second light reaching said outer face via said curved-for-refraction portions are generated from primary light so that said first light and second light are emitted from said outer face as a synthesized light.

The present invention enables a surface light source device and light path control plate to have an emission face showing a uniformalized brightness. In addition, light emitted from a point-like light source(s) is converted into "a component like a surface light source", thereby improving clearness of display image on a screen, and besides, enabling good viewing directions to be controlled. Specifically, large screen displaying may have pixels each of which corresponds to a "component like a surface light source".

EMBODIMENT

Embodiments in accordance with the present invention are described below by referring to the drawings.

<Outlined Structure of Surface Light Source Device>

FIGS. 1 to 7 illustrate a surface light source device of an embodiment in accordance with the present invention.

Figure 1:
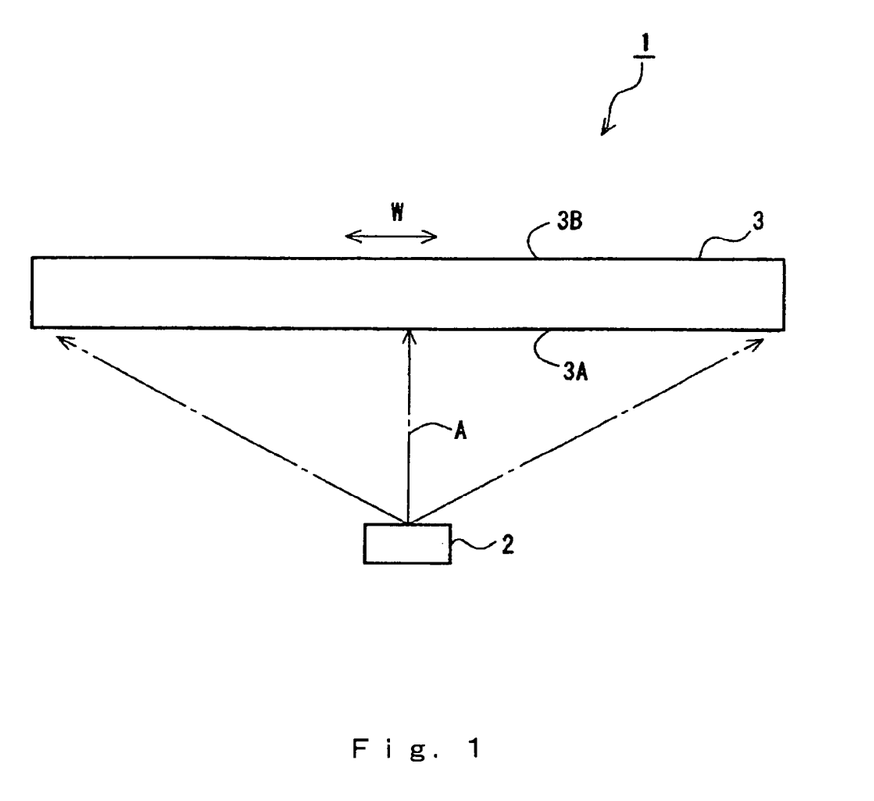
FIG. 1 is an outlined side view showing a surface light source device of an embodiment in accordance with the present invention.
Figure 2:
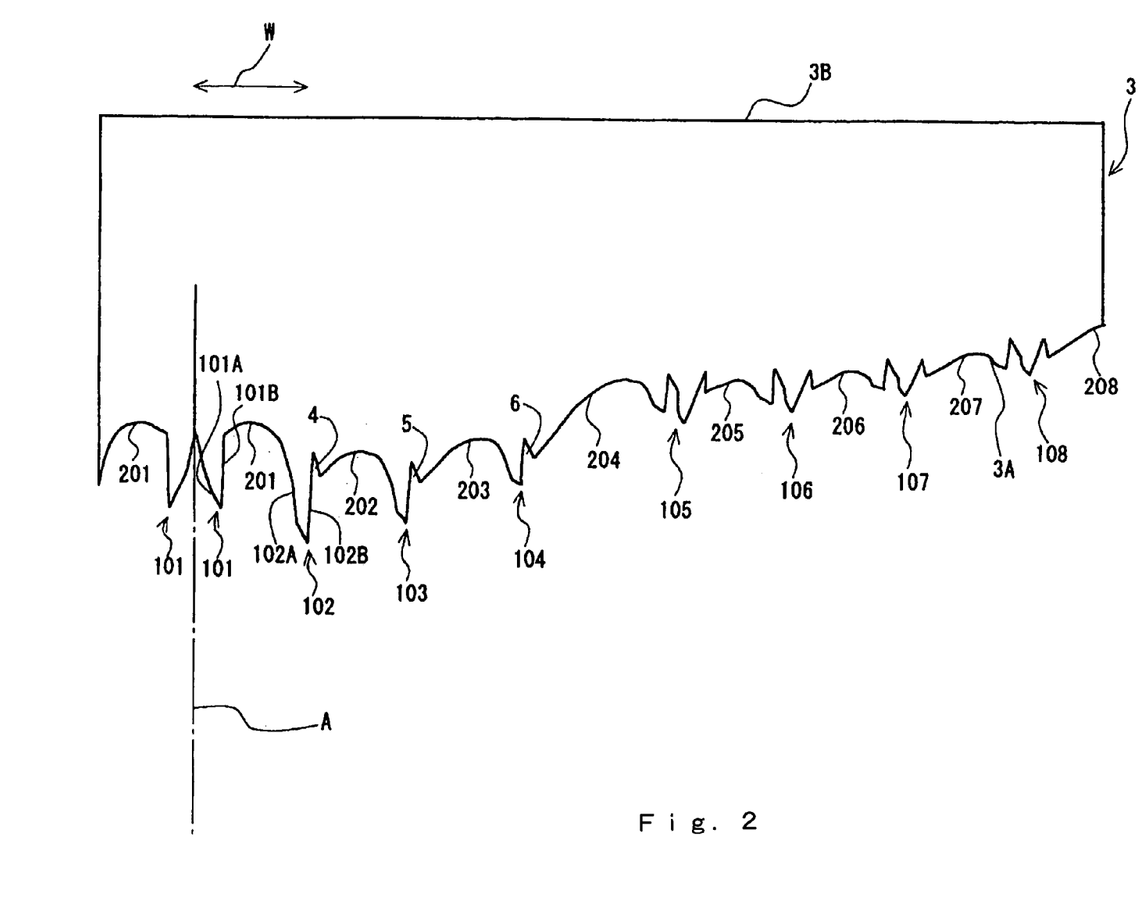
FIG. 2 is a cross sectional view showing a main part of a light path control plate employed in the embodiment.
Figure 3:
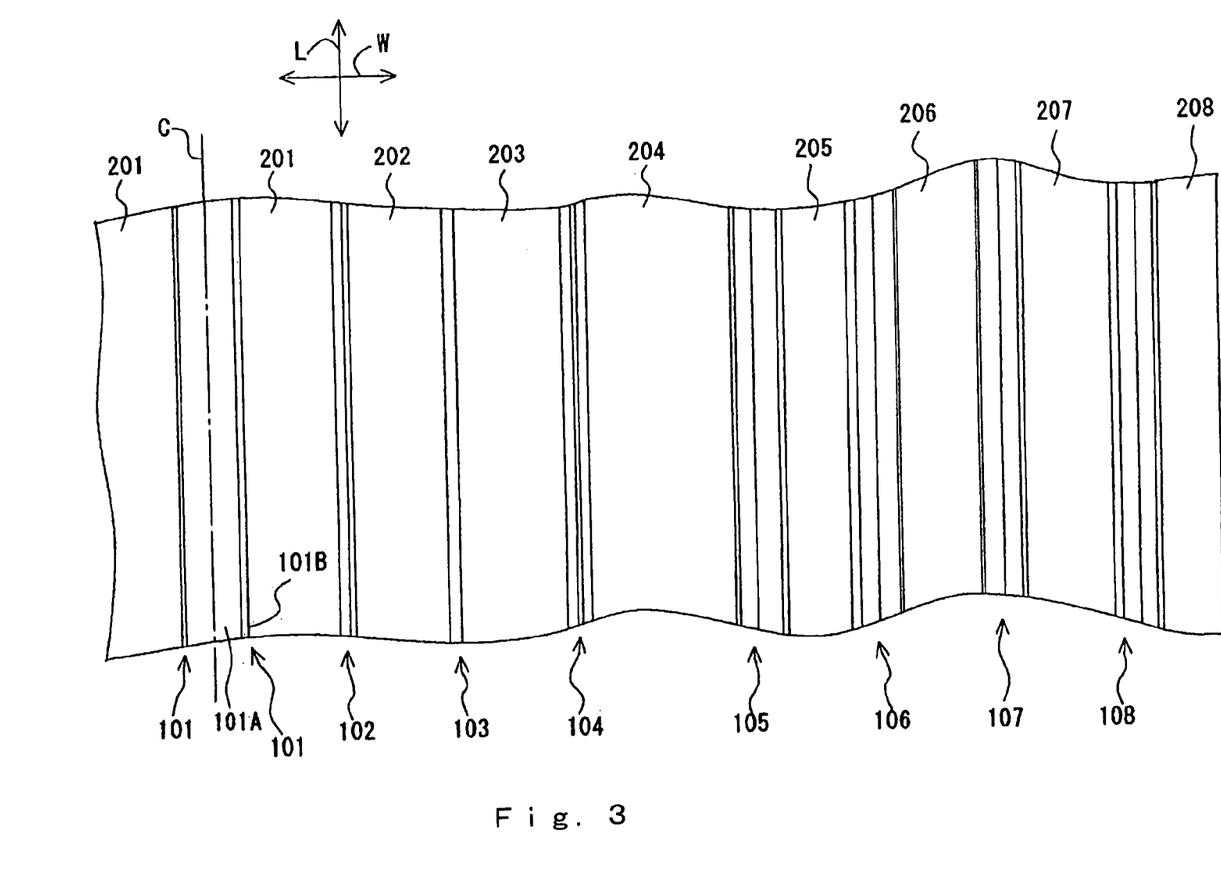
FIG. 3 is a back plan view showing an inner face of the light path control plate employed in the embodiment.
Figure 4:
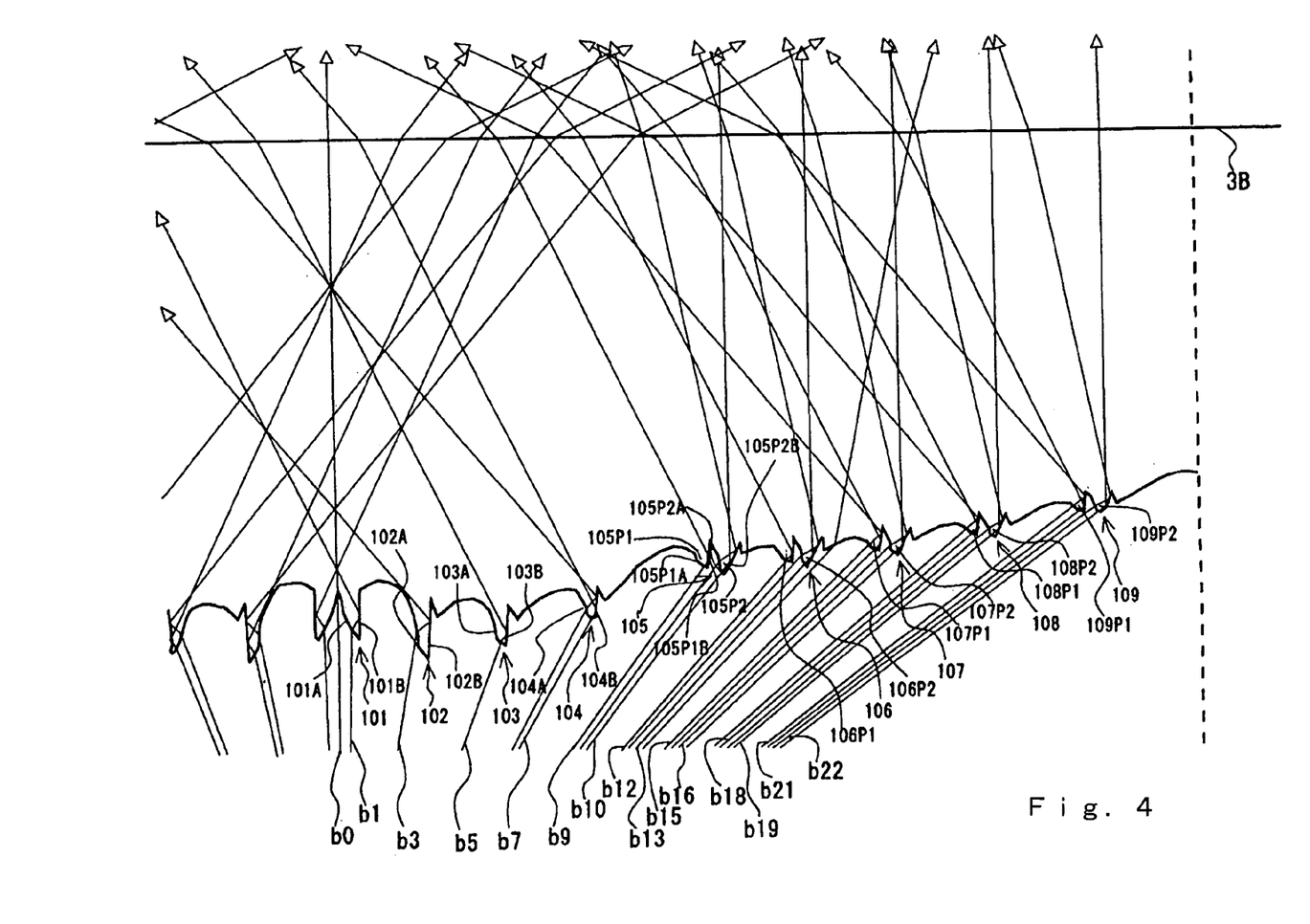
FIG. 4 is a cross sectional view illustrating paths of light passes a transmission-reflection portion of the light path control plate employed in the embodiment.
Figure 5:
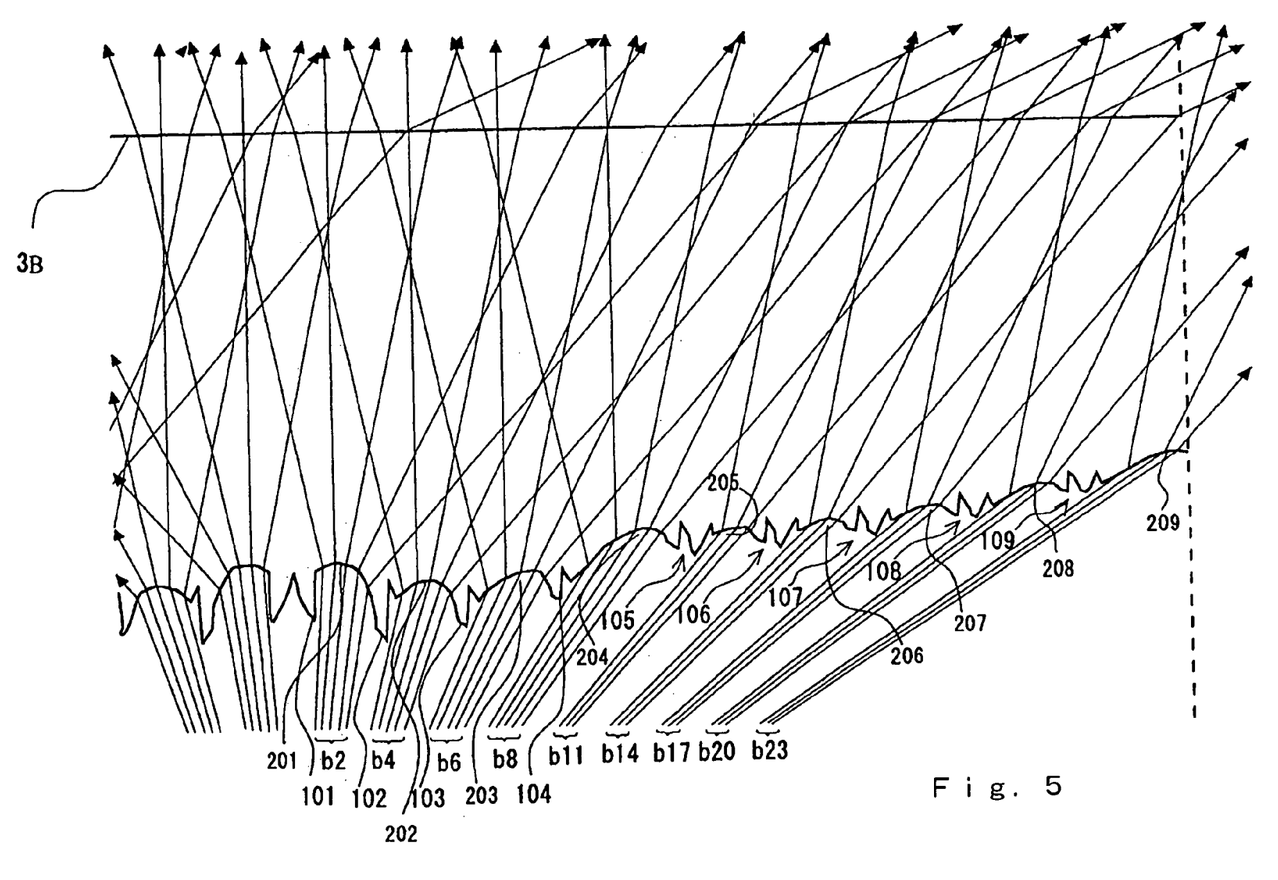
FIG. 5 is a cross sectional view illustrating paths of light passes a curved-for-refraction portion of the light path control plate employed in the embodiment.
Figure 6:
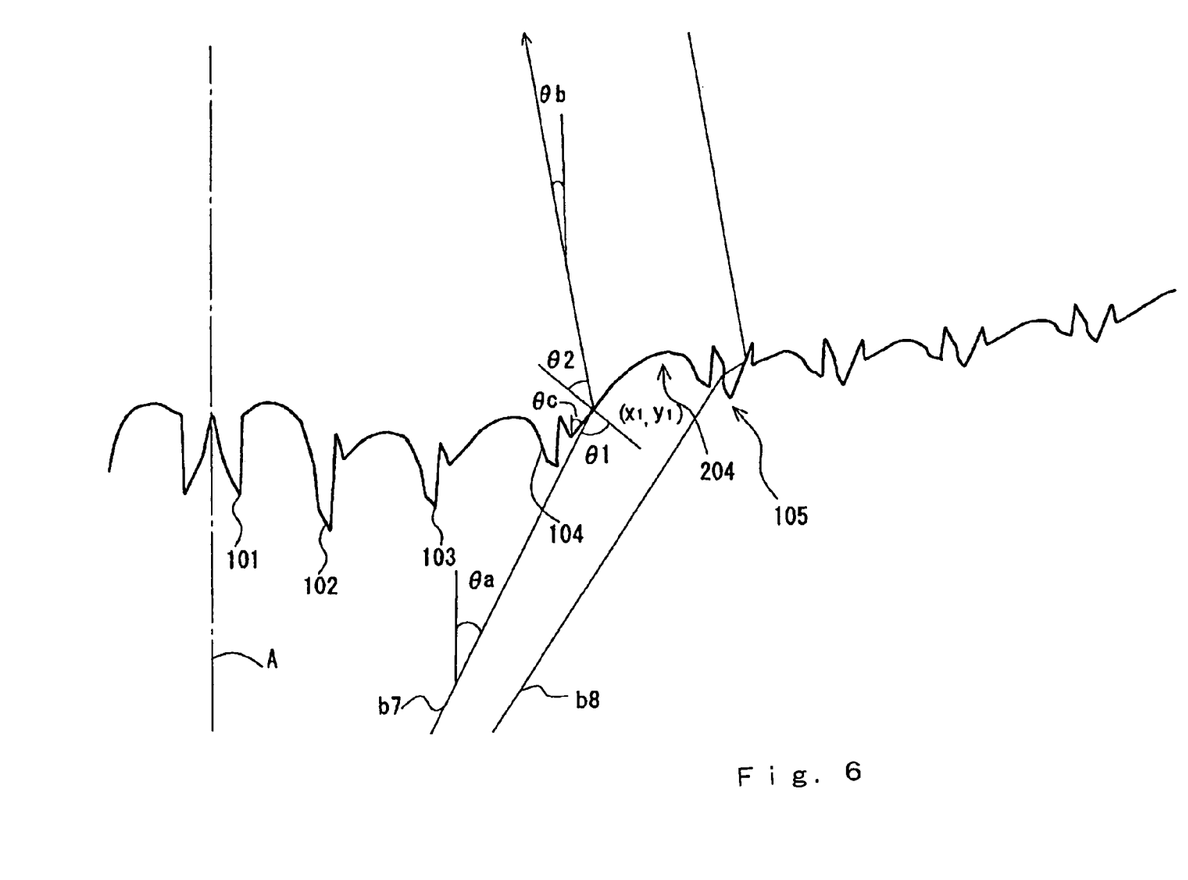
FIG. 6 is a diagram illustrating a path of light incident to a curved-for-refraction portion located between a transmission-reflection portion consisting of one projection and another transmission-reflection portion consisting of two projections, and a path of light incident to the transmission-reflection portion consisting of two projections.
Figure 7:
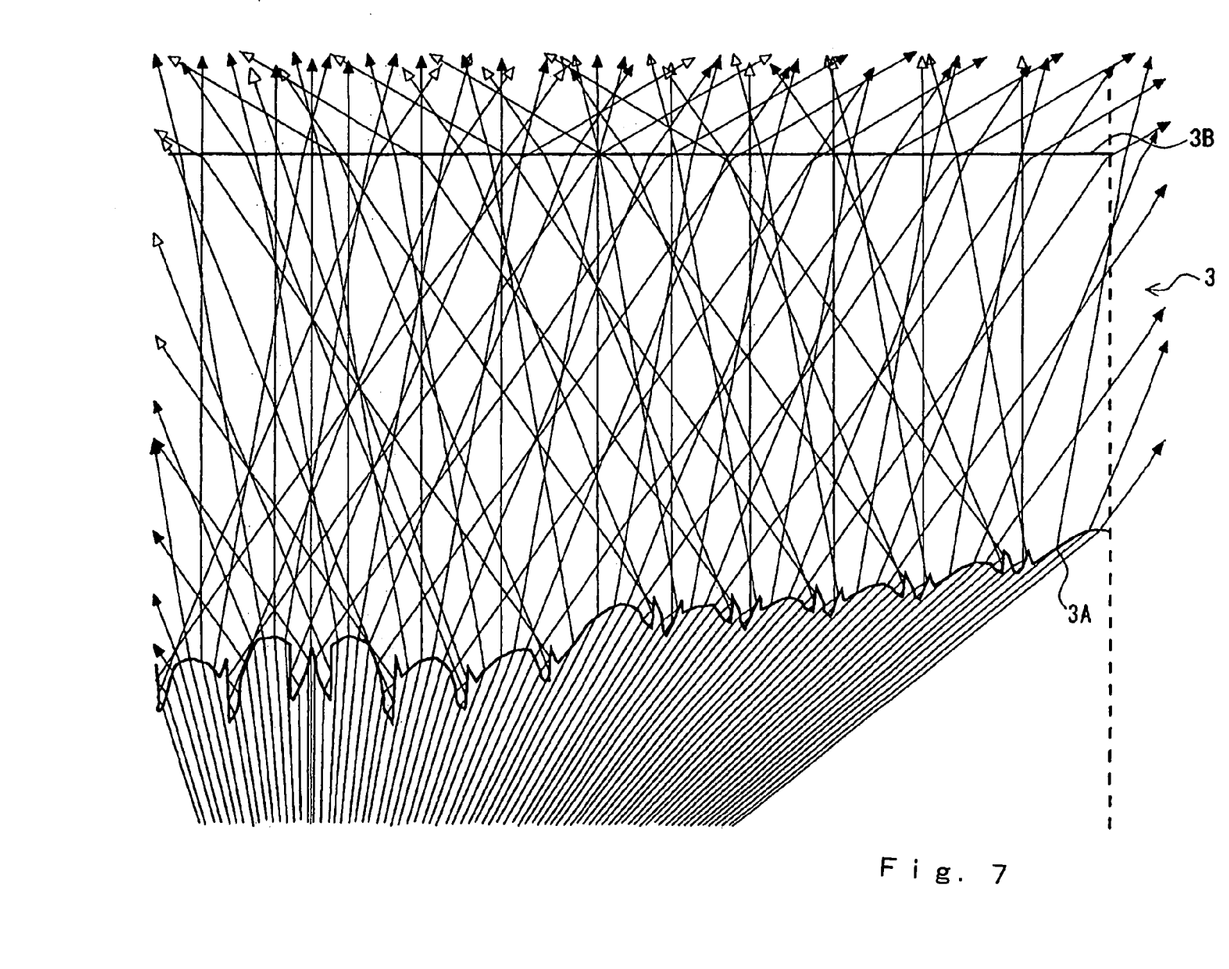
FIG. 7 is a diagram illustrating paths of light passing the light path control plate employed in the embodiment.

FIG. 1 is an outlined side view showing the surface light source device. FIG. 2 is a cross sectional view showing a main part of a light path control plate. FIG. 3 is a back plan view showing an inner face of the light path control plate. FIG. 4 is a cross sectional view illustrating paths of light passes a transmission-reflection portion of the light path control plate. FIG. 5 is a cross sectional view illustrating paths of light passes a curved-for-refraction portion of the light path control plate. FIG. 6 is a diagram illustrating a path of light incident to a curved-for-refraction portion located between a transmission-reflection portion consisting of one projection and another transmission-reflection portion consisting of two projections, and a path of light incident to the transmission-reflection portion consisting of two projections and FIG. 7 is a diagram illustrating paths of light passing the light path control plate.

Surface light source device 1 is generally composed of transparent and rectangular light path control plate 3 and LED 2 as a point-like light source supplying primary light to light path control plate 3. Light path control plate 3 is, for example, made of transparent resin material. LED 2 has a certain directivity angle and is disposed so that light axis A is vertical to a center portion of inner face (i.e. light incidence face opposite to LED 2) 3A of light path control plate 3.

<Structure of Light Path Control Plate>

As shown in FIG. 2, a major face of light path control plate 3 provides inner face 3A on which transmission-reflection portions and curved-for-refraction portions are formed alternately as toward both outer sides along width direction W from the center portion that meets light axis A. Transmission-reflection portions include ones consisting of a single projection and ones consisting of two or more projections. For the sake of description, each transmission-reflection portion is referenced by 101, 102 . . . and each curved-for-refraction portion is referenced by 201, 202 . . . .

As shown in FIG. 3, transmission-reflection portions and curved-for-refraction portions extend in parallel with each other along length direction L perpendicular to width direction W. Areas along width direction W on both sides of center line C on inner face 3A are configurated symmetrically to each other with respect to center line C. Concretely saying, transmission-reflection portions and curved-for-refraction portions are disposed alternately, like first transmission-reflection portion 101, first curved-for-refraction portion 201, second transmission-reflection portion 102, second curved-for-refraction portion 202 . . . , on one side of center line C.

In a similar manner, transmission-reflection portions and curved-for-refraction portions are disposed alternately on the other side of center line C.

First transmission-reflection portion 101 is provided with a projection-like configuration having a V-shaped cross section projecting toward an inner side (namely, toward LED 2 side), extending along length direction L and being composed of transmission face 101A and reflection face 101B, wherein transmission face 101A is located on center line C side and reflection face 101B is remote from center line C as compared with transmission face 101A. Transmission face 101A provides a curved and inclined face.

As shown in FIG. 4, transmission face 101A refracts light b1 emitted from LED 2 (hereafter called "LED light") toward reflection face 101B. Reflection face 101B reflects the light refracted by transmission face 101A toward outer face 3B provide by another major face of light path control plate 3. LED light b0, which is incident to a boundary portion of a pair of first transmission-reflection portions 101 formed as to sandwich center line C, proceeds to outer face 3B side of light path control plate 3 without being subject to refraction operation in width direction W.

It is noted that incident light b1 to first transmission-reflection portion 101 is represented by a single beam in FIG. 4 for the sake of description. Needless to say, actual light incidence occurs on transmission face 101A overall.

On the outer side in width direction W of first transmission-reflection portion 101, first curved-for-refraction portion 201 extends along length direction L, being configurated like a concave groove consisting of a curved face curving toward outer face 3B.

As shown in FIG. 5, first curved-for-refraction portion 201 refracts light b2 emitted from LED 2 and guides to outer face 3B side. Curvature of curved face on first curved-for-refraction portions 201 is set so that refracted light is dispersed toward outer face 3B.

It is noted that incident light b2 to first curved-for-refraction portion 201 is represented by five beams in FIG. 5 for the sake of description.

Second transmission-reflection portions 102 like projections are formed on the outside of first curved-for-refraction portions 201. Second transmission-reflection portion 102 is composed of transmission face 102A continuously adjoining first curved-for-refraction portion 201 and reflection face 102B. Function of each of transmission face 102A and reflection face 102B is generally the same as that of the above-mentioned transmission face 101A and reflection face 101B of first transmission-reflection portion 101.

Incidence of LED light to Second transmission-reflection portion 102 occurs at a small angle with respect to light axis A. Therefore second transmission-reflection portions 102 are formed as to avoid outside-adjacent second curved-for-refraction portions 202 from being shaded due to obstruction of light incidence thereto. That is, when a provisional line which extends toward outer side 3B as to pass LED 2 (light emitting center) and a top of projection provided by second transmission-reflection portion 102, second transmission-reflection portion 102 avoids themselves from extending across the provisional line toward center line C, thereby preventing shade, which is produced by second transmission-reflection portion 102 shielding LED light, from landing on second transmission-reflection portion.

On the other hand, an end edge on the side of outer face 3B of reflection face 102B is located on the side of outer face 3B with respect to an end edge, nearer to center line C, of second curved-for-refraction portion 202 in order to secure an area enough to receive the light refracted by transmission face 102A. Therefore, groove 4 is formed between second transmission-reflection portion 102 and second curved-for-refraction portion 202 as shown in FIGS. 2, 4 and 5. It is noted that a side wall of groove 4 nearer to center line C provides a part of reflection face 102B.

Third transmission-reflection portion 103 is formed on the outer side of second curved-for-refraction portion 202, and further outside thereof, third curved-for-refraction portion 203 is formed across groove 5. As described above, transmission-reflection portions and curved-for-refraction portions are formed alternatingly. toward the outer side of light path control plate 3. In groove 5 adjacent to third transmission-reflection portion 103 and groove 6 4 adjacent to forth transmission-reflection portion 104, side walls nearer to center line C provide parts of reflection faces 103B and 104B, respectively.

Previously mentioned, transmission-reflection portions include ones consisting of a single projection and ones consisting of two or more projections.

Usually, number of light beams (light intensity) guided from a transmission face and reflection face of inner face 3A and variations of beam directions are reduced according to an increasing distance from center line C on outer face 3B. If this is corrected so that number of light beams and variations of beam directions are secured at outer face 3B, uniformalized direction dispersion and uniformalized imaginary emitting brightness of emission are achieved on outer face 3B, which provides an imaginary emitting face, of light path control plate 3. It is noted that an imaginary emitting face may be set in the vicinity of outer face 3B instead of just on outer face 3B like the case in this embodiment.

In this embodiment, as exemplarily shown in FIG. 3, each of first to forth transmission-reflection portions 101-104 is formed of single projection and each of fifth transmission-reflection portion 105 and ones outer than it in width direction W is formed of two projections (105P1,P2, 106P1, P2 . . . ).

In the case of light path control plate 3 employed in this embodiment, a zone (single-projection-zone) in which each transmission-reflection portion is formed of single projection is determined according to the following formulae. Angles are defined as follows by paying attention to light beam b7 which is incident to forth curved-for-refraction portion 204 outer-adjacent to forth transmission-reflection portion 104, as shown in FIG. 6.

θa=Angle made by light b7 incident to forth curved-for-refraction portion 204 and light axis A θb=Aiming angle made by light b7 after being refracted by forth curved-for-refraction portion 204 toward outer face 3B side and light axis A θc=Angle made by a surface close to an end edge on the side of center line C on forth curved-for-refraction portion 204 and light axis A θ1 =Angle made by a normal at incidence position (x1, y1) of light b7 on forth curved-for-refraction portion 204 and light b7

θ2=π/2−θc−θb

θ2=Angle made by light after being refracted by forth curved-for-refraction portion 204 and the forementioned normal θ2=π/2−θc−θb θb=π/2−θc−sin$^{-1}$(sin θ1/n)

Here, π/2−θ1=θc−θa

Therefore, b=π/2−θc−sin$^{-1}${sin(π/2+θa−θc)/n}

If actual aiming angle of emission is denoted by θb', the single-projection-zone is a range satisfying a relation such that θc>θa and a θb'≦π/2−θc−sin$^{-1}${sin(π/2+θa−θc)/n}.

If the above condition cannot be satisfied, transmission-reflection portions consisting of projection pairs are needed.

That is, if it is intended that light b8 incident to an outer-located projection of fifth transmission-reflection portion 105 has the same aiming angle as that of light produced by refracting b7 incident to forth transmission-reflection portion 104, light b8 is required to be incident to the outer-located projection of fifth transmission-reflection portion 105. It is noted that number of transmission-reflection portions each of which consists of a single projection is subject to no limitation so far as the above formulae are satisfied, although this employed in shows a case of four transmission-reflection portions each of which consists of a single projection.

Further saying, light path control function of any transmission-reflection portion may be adjusted, as required, by employing three or more projections adjacent to each other.

<Operation of Surface Light Source Device>

Next, operation of surface light source device 1 is described. If LED 2 lights on, inner face 3A of light path control plate 3 is irradiated by light at a certain directivity angle radially.

Manners of light path changing by transmission-reflection portions and those by curved-for-refraction portions are different from each other. Description on incidence to transmission-reflection portions and that on incidence to curved-for-refraction portions are separated hereafter.

<Effects of Transmission-Reflection Portions>

FIG. 4 is an abstracted view of light incidence to transmission-reflection portions, showing light path changings of the incident light. First, light b0 incident to boundary between first transmission-reflection portions 101 travels generally straight within light path control plate 3, being emitted from outer face 3B.

Light b1 incident to transmission face 101A of first transmission-reflection portion 101 is refracted and guided to reflection face 101 B, being outputted from reflection face 101B toward a certain aiming angle direction. In similar manners, each light b3, b5, b7 incident to transmission face 102A, 103A, 104A is refracted and reflected at reflection face 102B, 103B, 104B, being outputted from reflection face 101B to a certain aiming angle direction. It is noted that light outputs from reflection faces 102B, 103B and 104B are generally parallel to each other.

Next, light b9 incident to transmission face 105P1A of projection 105P1, nearer to center line C, of fifth transmission-reflection portion 105 is reflected at reflection face 105P1B as to change light path to a direction approximately the same as that of light reflected at reflection faces 102B-104B.

Further, light b10 incident to transmission face 105P2A of outer-located projection 105P2 of fifth transmission-reflection portion 105 is reflected at reflection face 105P2B as to change light path to a direction approximately vertical to outer face 3B.

Such effects of fifth transmission-reflection portion 105 are generally the same those of outer-located transmission-reflection portions such as sixth transmission-reflection portion 106 or seventh transmission-reflection portion 107. That is, first to forth transmission-reflection portions 101-104 each of which consists of a single projection have functions changing incident light to light inclined at a certain angle with respect to outer face 3B.

On the other hand, at outer-located transmission-reflection portions, each of which consists of two projections, each projection of each pair has function changing light path to a individual direction.

It is noted that light after passing through transmission-reflection portions contains plenty of inclined emission light in the vicinity of center line C on outer face 3B and, emission light directed near to a vertical direction with respect to light path-control plate 3 increases according to an increasing distance from center line C.

Although light path changing due to refraction is applied to light reaching outer face 3B, design is made so that large changing of emitting direction does not occur. Refraction at outer face 3B is adjusted through relation between refractive index of material of light path control plate 3 and that of air.

<Effects of Curved-for-Refraction Portions>

Next, effects of curved-for-refraction portions described by referring to FIG. 5. It is noted that FIG. 5 is an abstracted view of light incidence to curved-for-refraction portions, showing light path changings of the incident light.

First, light b02 incident to first curved-for-refraction portion 201 is refracted and dispersed by first curved-for-refraction portion 20, being directed toward outer face 3B. Dispersion angle at second to forth curved-for-refraction portions 202-204 are approximately the same as that at first curved-for-refraction portion 201.

In such ways, light is dispersed to both sides of a direction of light axis A at first to forth curved-for-refraction portions. That is, light after passing through any of first to forth curved-for-refraction portions 201-204 contains component (beam) vertical to outer face 3B. As shown in FIG. 4, component (beam) vertical to outer face 3B is poor at first to forth transmission-reflection portions 101-104.

However, since light after passing through any of first to forth curved-for-refraction portions 201-204 contains component (beam) vertical to outer face 3B, an approximately uniform direction-dispersion occurs everywhere on outer face 3B when light passes through outer face 3B as an imaginary emitting face.

On the other hand, light incidence to fifth curved-for-refraction portion 305 and other outer curved-for-refraction portions occurs at a rather large angle with respect to light axis A, as shown in FIG. 5. Accordingly, light travels to a direction outer than light axis A due to being refracted.

However, as described above, since plenty of components (beams) exist at fifth transmission-reflection portion 105 and other transmission-reflection portions outer than it, light distribution on fifth curved-for-refraction portion 205 and other curved-for-refraction portions outer than it and that on fifth transmission-reflection portion 105 and other transmission-reflection portions outer than it are combined.

This leads to a result such that an approximately uniform direction-dispersion occurs everywhere on outer face 3B when light passes through outer face 3B as an imaginary emitting face.

After all, light coming from transmission-reflection portions and that coming from curved-for-refraction portions are added up or synthesized. In other words, a state as shown in FIG. 7 is obtained by adding light illustrated in FIG. 4 to that illustrated in FIG. 5. As understood from FIG. 7, degree of light direction-dispersion on outer face 3B as an imaginary emitting face is approximately uniform.

As described above, this embodiment gives an good dispersion to the light emitted from point-like light source, realizing a state seeming as if point-like light sources are massed on the imaginary emitting face. In other words, a "surface light source" corresponding to the imaginary emitting face is provided.

Surface light source device 1 provides a wide viewing angle because light is emitted to various directions. In addition, glaring can be reduced on using as direct illumination because light dispersion at outer face 3B is uniformalized.

It is noted that directivity-giving portions (a plurality of projection portions) which change paths of light toward outer face 3B as to be generally directed to a certain direction may be formed as to extending in a direction vertical to an extending direction of transmission-reflection portions curved-for-refraction portions. Further, it is needles to say that a light path control plate may have a shape other than rectangle employed in the above embodiment.

<Structure of Display>

Next described is a display of an embodiment in accordance with the present invention by referring to FIGS. 8 to 12.

Figure 8:
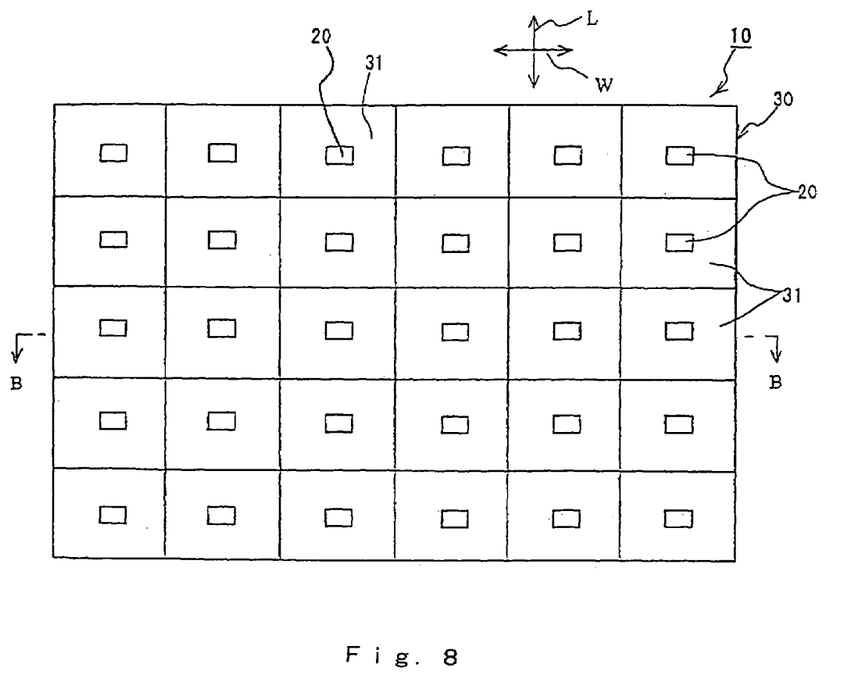
FIG. 8 is an outlined side view showing a display of another embodiment in accordance with the present invention.
Figure 9:
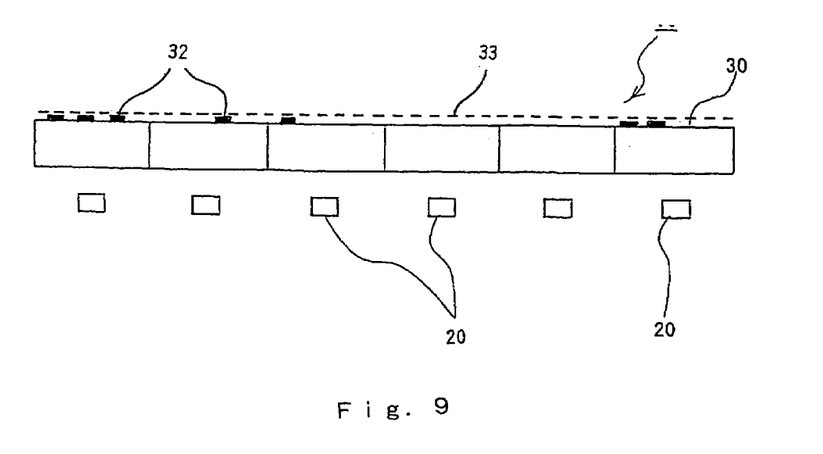
FIG. 9 is a cross sectional view along line B-B in FIG. 8.
Figure 10:
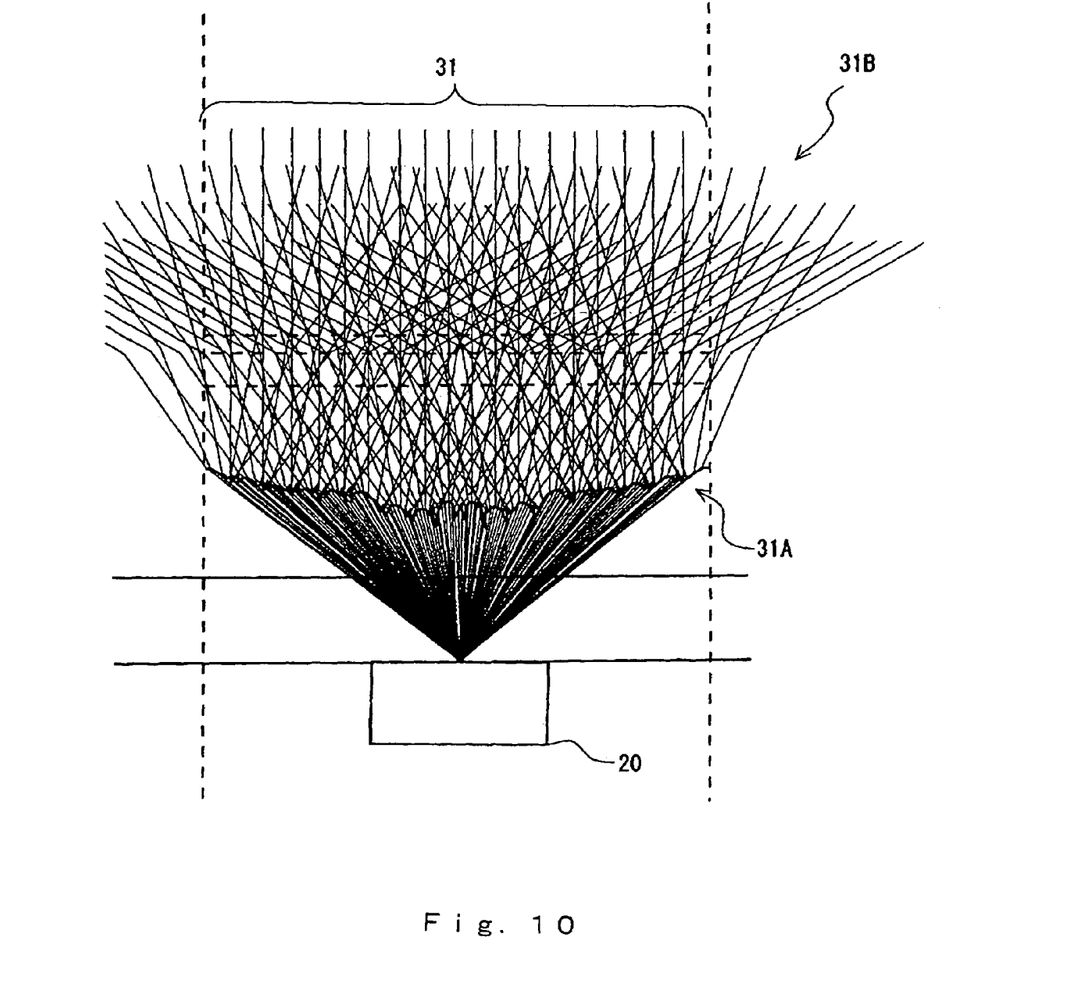
FIG. 10 is a cross sectional diagram illustrating light paths in a main part of one section of the display shown in FIG. 8.
Figure 11:
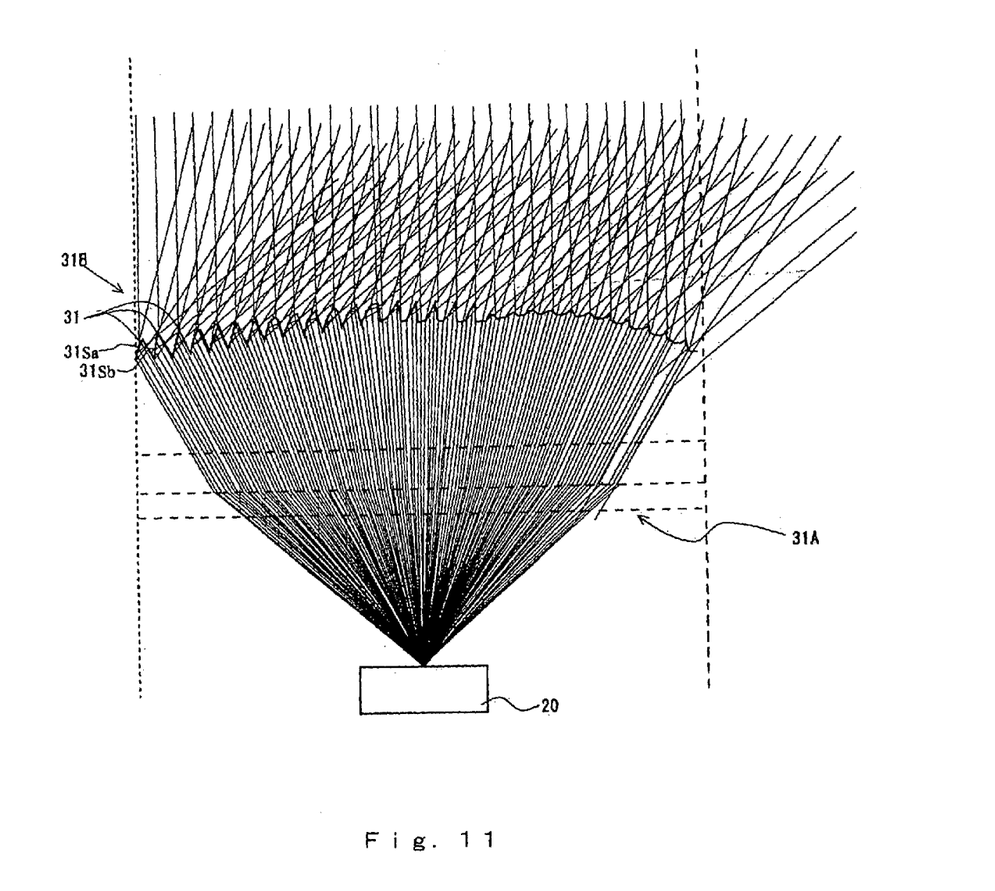
FIG. 11 is a cross sectional diagram illustrating light paths in a directivity giving portion formed on an outer face of one section of the display shown in FIG. 8.
Figure 12:
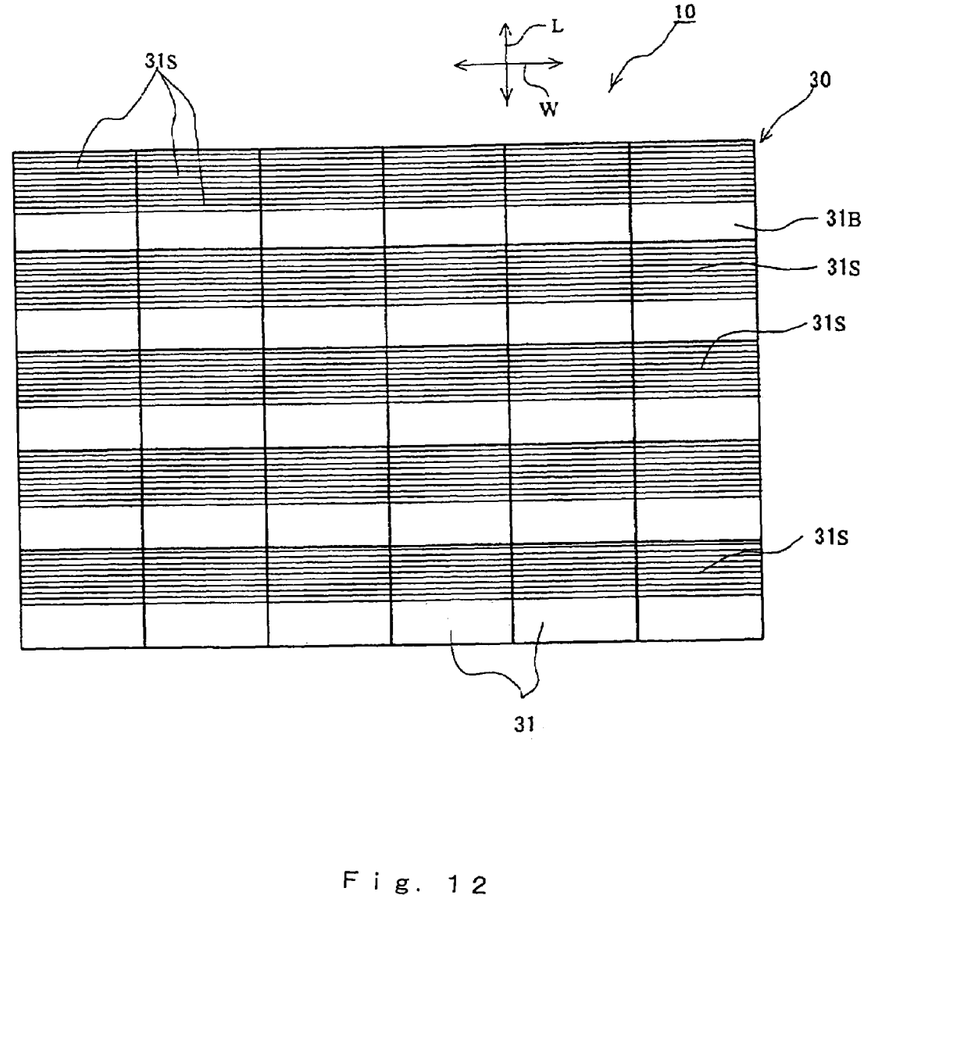
FIG. 12 is a frontal view of the light path control plate employed in the display shown in FIG. 8; and, FIG. 13 is a cross sectional view of a display of a modification in accordance with the present invention.

FIG. 8 is a back view showing a display of this embodiment, FIG. 9 being a cross sectional view along line B-B in FIG. 8, FIG. 10 being a cross sectional diagram showing one section along width direction W, FIG. 11 being a cross section showing one section along length direction L, AND FIG. 12 being a frontal view of a light path control plate.

As shown in FIGS. 8 and 9, display 10 is generally composed of rectangular light path control plate 30 and a plurality of point-like light sources (LEDs 20) which is disposed opposite to light path control plate 30 and supply light to light path control plate 30.

A bright-dark (light-permeable-nonpermeable) medium for displaying, referenced by numeral 32 is, in this case, formed on light path control plate 30 itself. Instead of this, liquid crystal display panel 33 may be disposed separately as shown by dotted line.

As shown in FIG. 8, light path control plate 30 a plurality of sections 31 like a matrix. Each section 31 has generally the same structure as that of light path control plate 3 employed in the above-described surface light source device 1.

That is, each section 31 of light path control plate 30 has an inner face 31A on which transmission-reflection portions and curved-for-refraction portions are formed alternatingly. like light path control plate 3 as shown in FIG. 10. Regarding this alternating-structure, description is not repeated because details are described in the above embodiment.

It is noted that these sections 31 are provided by light path control plate 30 itself, being formed like an array on a peace of substrate. Sections 31 are formed so that the transmission-reflection portions and curved-for-refraction portions extend in one direction. It is noted that the extending direction in this embodiment is the same as length direction L shown in FIG. 8. Further, a plurality of projection-like directivity-giving portions 31S are formed on outer face 31B of each section 31 as to extend in a direction (width direction W shown in FIG. 8) vertical to the extending direction of the transmission-reflection portions and curved-for-refraction portions.

Directivity-giving portion 31S is provided with reflection face 31Sa totally reflecting light path-changed on the side of inner face 31A and transmission face 31Sb allowing the light reflected by reflection face 31Sa to transmit. Directivity-giving portion 31S changes path of light emitted from outer face 3B to a viewing direction from which light path control plate 30 is viewed as a displaying face.

For example, in a case where display 10 is viewed from an oblique lower side like large display panel, directivity-giving portion 31S is formed on generally upper half part of each outer face 31B of each section 31 as shown in FIG. 12. This light traveling toward the oblique lower side is obtained. In other words, light for display is dispersed toward lower directions to provide a wide viewing angle for oblique lower directions.

Figure 13:
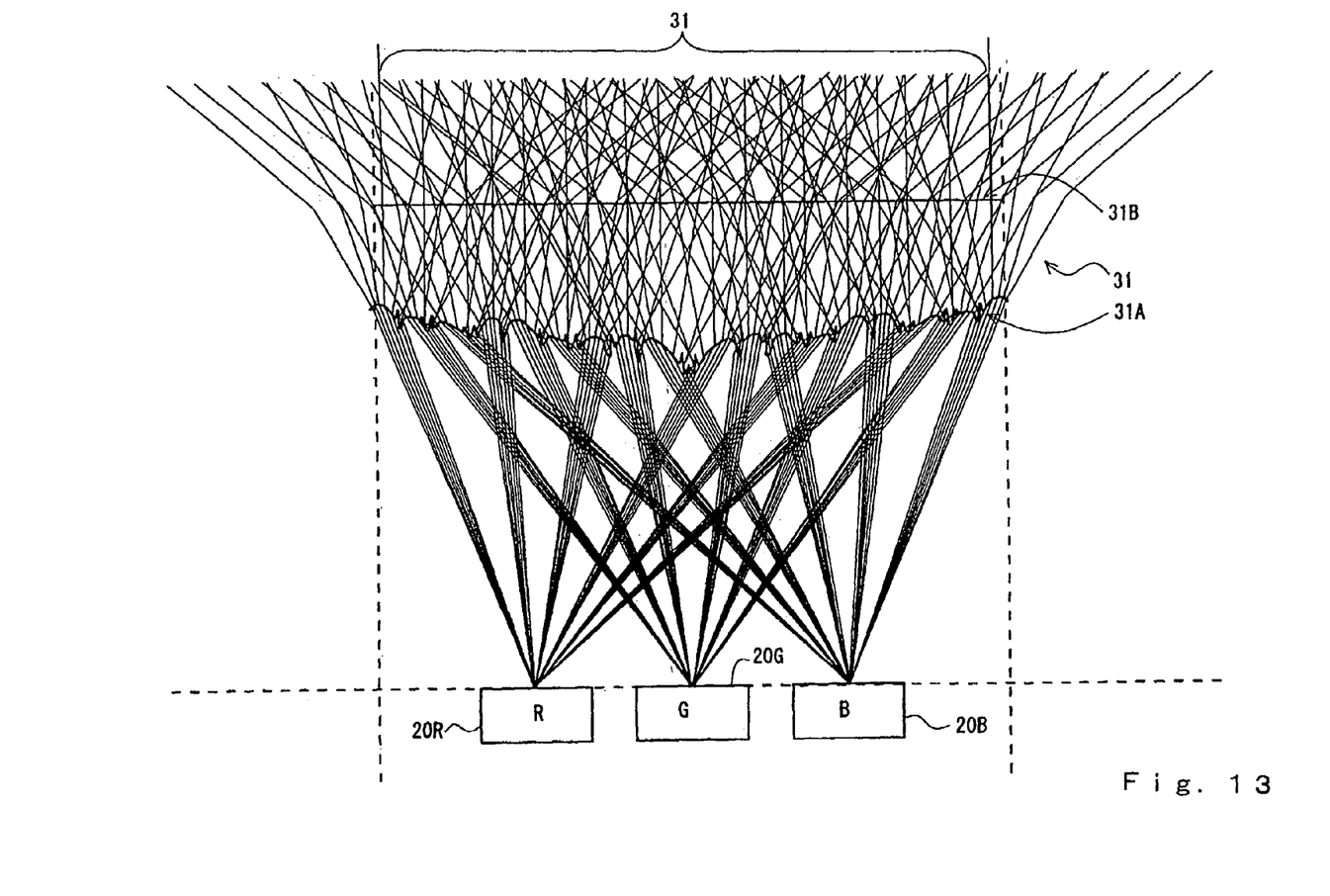

A plurality of LEDs 20 may emit light of the same color or otherwise. For example, LED 20 emitting R-light (red light), LED 20 emitting G-light (green light) and LED 20 emitting B-light (blue light) may be disposed in a predetermined arrangement. As shown in FIG. 13, LEDs 20R, 20G and 20B emitting light colored of R, G and B respectively may be disposed opposite to each inner face 31A of each section 31.

In this case, shapes of transmission-reflection portions and curved-for-refraction portions formed on an inner face of each section 31 are modified from those shown in FIG. 10 as to be able to correspond to LEDs 20R, 20G and 20B, respectively.

Such structure that each section 31 has LEDs 20R, 20G and 20B of three colors allows display colour of each section 31 to be controlled by adding-up-color-mixing. Such light path control plate 30 is produced, for example, by transmission-reflection portions and curved-for-refraction portions are formed alternatingly. along length direction L on one face (inner face) of a flat transparent resin plate by applying cutting. Then directivity-giving portions 30S are formed along width direction W on the other face (outer face) by applying cutting. Alternatively, molding technique using a mold may be utilized.

Further, light path control plate 30 may be made of a material other than resin, for example, may be made of transparent material such as glass.

In the above-described display, LED light is incident to each inner face of each section 31 and is dispersed well by transmission-reflection portions and curved-for-refraction portions, then reaching the vicinity of outer face 31B where a surface-like light source is provided corresponding to sections 31 as if point-like light sources uniformly gathered. Accordingly, light emitted form each section 31 has various angles. As a result, light path control plate 30 provides a wide viewing angle for image display. In addition, glaring is reduced because uniform dispersion is effected on outer face 31B of each section 31.

It is noted that each outer face 31B of each section 31 may be used so that individual outer face 31B corresponds to one pixel (basic unit element composing image) by regarding individual outer face 31B as a uniform surface-like light source element.

Surface light source devices in accordance with the present invention as describe above are may be applied to usages such as interior display lighting, backlighting for liquid crystal display panels and various illumination devices. Further, Displays in accordance with the present invention are may be applied to usages such as large screen liquid crystal display panels because wide viewing angles are provided under good control of directivity.

What is claimed is:

1. A surface light source device, comprising:
   a light path control plate; and
   at least one point-like light source supplying primary light toward said light path control plate, wherein
      said light path control plate has an inner face to which said primary light is incident and an outer face which is opposite to said inner face,
      said inner face is provided with projection-like transmission-reflection portions, each of which is composed of a transmission face permitting primary light to transmit through the transmission face and a reflection face which reflects transmitted light to bring changed light paths directed to said outer face, and curved-for-refraction portions, each of which refracts primary light to bring changed light paths directed to said outer face, said transmission-reflection portions and curved-for-refraction portions being arranged alternatingly,
      wherein first light reaching the outer face via said transmission-reflection portions and second light reaching said outer face via said curved-for-refraction portions are generated from primary light so that said first light and second light are emitted from said outer face as a synthesized light.

2. A surface light source device according to claim 1, wherein said transmission-reflection portions and curved-for-refraction portions extend in parallel to each other.

3. A display, comprising:
   a light path control plate;
   a plurality of point-like light sources supplying primary light toward said light path control plate; and
   a display part, wherein
      said light path control plate has a plurality of sections each of which has an inner face and an outer face, and at least one point-like light source is disposed opposite to the inner face of each of said sections for supplying primary light the same inner face, said inner face is provided with projection-like transmission-reflection portions, each of which is composed of a transmission face permitting primary light to transmit through the transmission face and a reflection face which reflects transmitted light to bring changed light paths directed to said outer face, and curved-for-refraction portions, each of which refracts primary light to bring changed light paths directed to said outer face, said transmission-reflection portions and curved-for-refraction portions being arranged alternatingly, wherein first light reaching the outer face via said transmission-reflection portions and second light reaching said outer face via said curved-for-refraction portions are generated from primary light so that said first light and second light provide, at said outer face, a synthesized light that illuminates said display part for displaying operation.

4. A display according to claim 3, wherein said transmission-reflection portions and said curved-for-refraction portions of all of said sections extend in one extending direction, and projection-like directivity-giving portions are formed along a direction vertical to said one extending direction on said outer face for changing paths of light emitted from said point-like light source is changed, after being changed by said transmission-reflection portions and said curved-for-refraction portions, so that said paths are inclined to any one side with respect to said one extending direction.

5. A display according to claim 3 or 4, wherein said plurality of point-like light sources include a plurality of point-like light sources emitting light of different colors from each other.

6. A display according to claim 3, wherein said display part is disposed on said light path control plate.

7. A display according to claim 3, wherein said display part is disposed separately from said light path control plate.

8. A light path control plate, comprising:
an inner face to which primary light from at least one point-like light source is incident; and
an outer face opposite to said inner face, wherein
said inner face being provided with projection-like transmission-reflection portions, each of which is composed of a transmission face permitting primary light to transmit through the transmission face and a reflection face which reflects transmitted light to bring changed light paths directed to said outer face, and curved-for-refraction portions, each of which refracts primary light to bring changed light paths directed to said outer face, said transmission-reflection portions and curved-for-refraction portions being arranged alternatingly along a leaving-direction from an optical axis direction of said point-like light source, wherein first light reaching the outer face via said transmission-reflection portions and second light reaching said outer face via said curved-for-refraction portions are generated from primary light so that said first light and second light are emitted from said outer face as a synthesized light.

9. A surface light source device, comprising:

a light path control plate, the light path control plate configured with an inner face to which primary light is incident and an outer face which is opposite to the inner face; and at least one point-like light source supplying the primary light toward the light path control plate, wherein a first light reaching the outer face via transmission-reflection portions and a second light reaching the outer face via curved-for-refraction portions are generated from the primary light resulting in the first light and the second light being emitted from the outer face as synthesized light, the curved-for-refraction portions alternating with the transmission-reflection portions.

10. A display according to claim 4, wherein said display part is disposed on said light path control plate.

11. A display according to claim 5, wherein said display part is disposed on said light path control plate.

12. A display according to claim 4, wherein said display part is disposed separately from said light path control plate.

13. A display according to claim 5, wherein said display part is disposed separately from said light path control plate.

* * * * *

UNITED STATES PATENT AND TRADEMARK OFFICE
CERTIFICATE OF CORRECTION

PATENT NO. : 7,284,884 B2 Page 1 of 1
APPLICATION NO. : 10/900319
DATED : October 23, 2007
INVENTOR(S) : Shingo Ohkawa It is certified that error appears in the above-identified patent and that said Letters Patent is hereby corrected as shown below:

Column 1, Line 65, change "not ed" to --noted--.

Column 6, Line 28, change "forementioned" to --aforementioned--.

Column 6, Line 38, change "and a" to --and--.

Column 7, Line 40, change "a" to --an--.

Column 7, Line 45, change "path-control" to --path control--.

Column 8, Line 33, change "an" to --a--.

Column 10, Line 24, delete "Further," and insert the same on Line 25 before "Displays".

Column 10, Line 25, change "Displays" to --displays--.

Signed and Sealed this

Twenty Second Day of April, 2008

JON W. DUDAS
*Director of the United States Patent and Trademark Office*